(12) United States Patent
McElheney

(10) Patent No.: US 7,270,383 B2
(45) Date of Patent: *Sep. 18, 2007

(54) RETAINING MECHANISM FOR A PROTECTIVE SHIELD OF A MONITOR

(76) Inventor: Billy W. McElheney, 312 East Ave. E, Midlothian, TX (US) 76065

( * ) Notice: Subject to any disclaimer, the term of this patent is extended or adjusted under 35 U.S.C. 154(b) by 211 days.

This patent is subject to a terminal disclaimer.

(21) Appl. No.: 10/807,787

(22) Filed: Mar. 24, 2004

(65) Prior Publication Data

US 2004/0212282 A1    Oct. 28, 2004

Related U.S. Application Data

(63) Continuation-in-part of application No. 09/891,933, filed on Jun. 26, 2001, now Pat. No. 6,755,491.

(51) Int. Cl.
*A47B 81/00* (2006.01)
(52) U.S. Cl. .................... 312/7.2; 312/223.3
(58) Field of Classification Search ............... 312/7.2, 312/223.1, 223.3; 108/50.01, 50.02, 108, 108/152; 52/36.2; 248/917
See application file for complete search history.

(56) References Cited

U.S. PATENT DOCUMENTS

| | | | | |
|---|---|---|---|---|
| 4,440,457 A | * | 4/1984 | Fogelman et al. | 463/46 |
| 4,603,229 A | * | 7/1986 | Menchetti | 174/48 |
| 5,281,018 A | * | 1/1994 | Cullinan | 312/223.2 |
| 5,328,145 A | * | 7/1994 | Charapich | 248/442.2 |
| 5,694,861 A | * | 12/1997 | Laukamm-Josten | 108/50.01 |
| 5,761,071 A | * | 6/1998 | Bernstein et al. | 700/237 |
| 5,765,797 A | * | 6/1998 | Greene et al. | 248/398 |
| 5,825,613 A | * | 10/1998 | Holden | 361/681 |
| 5,961,192 A | * | 10/1999 | Bernart et al. | 312/223.3 |
| 6,005,641 A | * | 12/1999 | Ui | 348/836 |
| 6,012,694 A | * | 1/2000 | Sullivan, III | 248/323 |
| 6,205,716 B1 | * | 3/2001 | Peltz | 52/36.2 |
| 6,454,234 B1 | * | 9/2002 | Westbrook | 248/317 |
| 6,755,491 B2 | * | 6/2004 | McElheney | 312/242 |
| 2001/0009346 A1 | * | 7/2001 | Waubant | 312/304 |
| 2002/0113530 A1 | * | 8/2002 | Ui | 348/836 |
| 2006/0022096 A1 | * | 2/2006 | Chan et al. | 248/129 |

\* cited by examiner

*Primary Examiner*—Janet M. Wilkens
(74) *Attorney, Agent, or Firm*—Michael Diaz

(57) ABSTRACT

A retaining mechanism for use on a Operator Interface Terminal (OIT). The OIT provides a partition between an operator working in a harsh environment and a control computer and monitor in a conditioned environment. The retaining mechanism includes two support pads mounted to the back side of the partition. The support pads support the bottom portion of the monitor. A retaining strap is affixed to the back side of the partition. The retaining strap holds the monitor against the partition.

7 Claims, 4 Drawing Sheets

RETAINING MECHANISM FOR A PROTECTIVE SHIELD OF A MONITOR

RELATED APPLICATIONS

This application is a continuation-in-part of U.S. Pat. Ser. No. 09/891,933 U.S. Pat. No. 6,755,491 entitled "OPERATIVE INTERFACE TERMINAL FOR USE IN A HARSH ENVIRONMENT," filed Jun. 26, 2001 in the name of Billy W. McElheney and is hereby incorporated in its entirety by reference herein.

BACKGROUND OF THE INVENTION

1. Technical Field of the Invention

This invention relates to computer interface equipment and, more particularly, to a retaining mechanism and system for a protective shield of a computer interface system for use in a harsh industrial environment.

2. Description of Related Art patent application Ser. No. 09/891,933 ('933) discloses a novel Operator Interface Terminal (OIT) for use in a harsh industrial environment. There is a wide array of sealed consoles that house computer components and protect the computer components from a harsh external environment, such as a process factory floor. However, '933 disclosed a vastly improved system which overcame the shortcomings of existing sealed consoles.

Although '933 discloses an OIT which protects components from the harsh environment, the OIT still requires expensive touch screen monitors. Although these specialized monitors are resilient to harsh environments, the monitors are both costly to purchase and maintain. Because of the cost of purchasing a monitor, if a monitor is inoperative, rather than replacing the monitor, an operator calls for service on the inoperative monitor. During the time waiting for the monitor to be fixed, the entire OIT is inoperative, which results in extremely costly down time at processing factories.

In order to overcome the disadvantages of existing systems, it would be advantageous to have an OIT which utilizes off-the-shelf monitors. Additionally, a retaining system is needed which enables the expeditious replacement of malfunctioning or damaged monitors. The present intention provides such a retaining apparatus.

SUMMARY OF THE INVENTION

In one aspect, the present invention is a retaining apparatus for retaining a monitor against a partition protecting the monitor from a harsh environment. The retaining apparatus includes two support pads for supporting a portion of the monitor upon the partition and a retaining strap for retaining the monitor against the partition.

In another aspect, the present invention is an Operator Interface Terminal (OIT) for providing a man-machine interface between an operator working in a harsh environment and a control computer and monitor in a conditioned environment. The OIT includes a front panel having a perimeter edge. The front panel is mounted on a front side of a partition. The front panel is sealed around the perimeter edge. The partition has a front side in the harsh environment, a back side in the controlled environment, and an aperture that is covered by the front panel. An interface device is attached to the front panel and is accessible by the operator for providing inputs to the control computer. The interface device is connected to the control computer through the aperture in the vertical partition. A support pad is affixed on the back side of the partition. A strap is affixed to the back side of the partition. The support pad supports a bottom portion of the monitor while the strap retains the monitor against the partition.

In still another aspect, the present invention is a retaining mechanism for use on an OIT providing a man-machine interface between an operator working in a harsh environment and a control computer and monitor in a conditioned environment. The retaining mechanism includes a partition on the OIT providing a barrier between the harsh environment on a front side of the partition and the conditioned environment on a back side of the partition. The retaining mechanism also includes two support pads mounted to the back side of the partition. The support pads support the bottom portion of the monitor. In addition, a retaining strap is affixed to the back side of the partition. The retaining strap holds the monitor against the partition.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
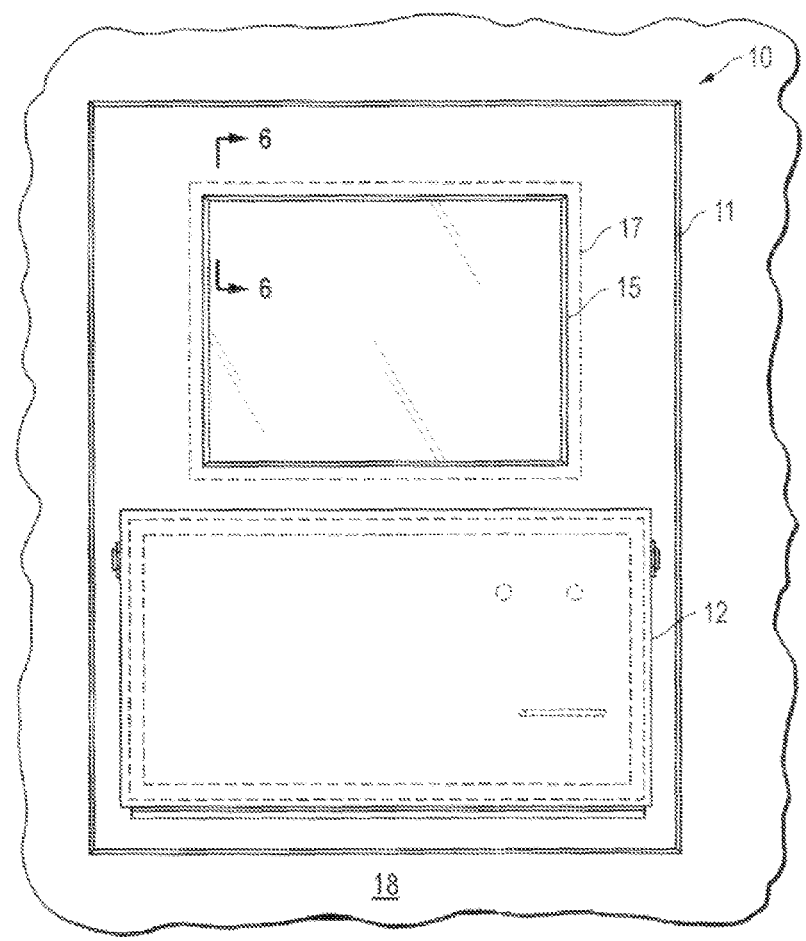
FIG. 1 is a front elevation view of the preferred embodiment of the OIT of the present invention.

FIG. 1 is a front elevation view of the preferred embodiment of the OIT 10 of the present invention. A front panel 11 includes a fold-down tray 12 that hold a keyboard 13 and a mouse 14 (not shown). A window 15 above the tray is for viewing a monetor 16. The bottom edge of the window may be cut sloping slightly downward and forward (for example, a 10-degree slope) so that any water that gets on the edge will run off. A raised ridge 17 surrounds the window on the back side of the front panel. The front panel is shown mounted on a section of a wall or door 18. The front panel may be constructed of a suitable hard material that is resistant to the harsh environment where the OIT is installed. For example, the preferred embodiment is constructed of stainless steel, which is preferred for a process factory floor due to its corrosion resistance properties.

Figure 2:
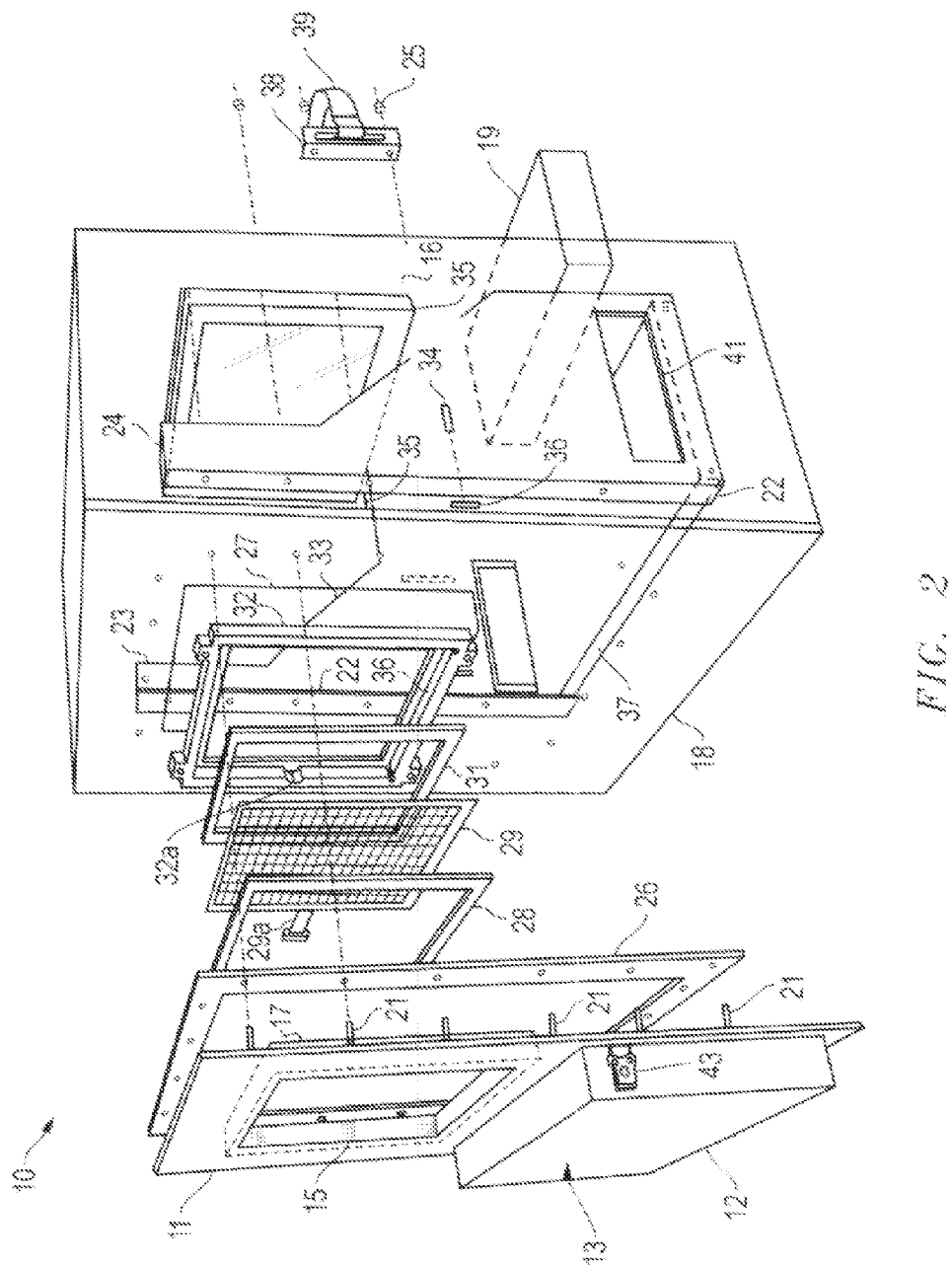
FIG. 2 is an exploded perspective view of the OIT of the present invention when mounted on the exemplary wall segment, and with a computer and monitor installed.

FIG. 2 is an exploded perspective view of the OIT 10 of the present invention when mounted on the exemplary wall segment 18, and with a computer 19 and monitor 16 installed. The front panel 11 includes a plurality of bolts 21 around its perimeter. The bolts extend through a gasket 26, the wall 18, and through a flange 22 of two flanged side panels 23 and 24. The bolts are secured with nuts 25 to hold the OIT securely on the wall. Thus, the door or wall is sandwiched between the side flanges and the front panel. The bolts can be of varying lengths, depending on the thickness of the door or wall. The gasket 26 covers the perimeter of the back side of the front panel and creates a seal between the front panel and the wall.

An aperture 27 is cut in the wall 18 behind the window 15 in the front panel. The raised ridge 17 surrounding the window on the back side of the front panel fits into the aperture 27. Surrounding the raised ridge is a second gasket 28 which is used to provide a seal on the front side of a flat panel touch screen 29 which is mounted in the window. The touch screen may be a resistive touch screen which is covered on the front side by a plastic resistive X-Y coordinate layer. The resistive screen is preferred because the protective plastic layer prevents the glass from being directly exposed to the factory environment. If the touch screen is impacted hard enough to break the glass, the outer resistive layer prevents glass fragments from contaminating the factory. This is important in industries such as the food industry. A third gasket 31 is mounted on the back side of the touch screen. The gaskets are preferably constructed of ⅛-inch gasket material since it is desirable to minimize the distance from the touch screen 29 to the monitor 16 in order to reduce parallax error when viewing the monitor from an angle.

A protective frame 32 fits over the touch screen and gaskets, and over the raised ridge 17. The frame may preferably be constructed from aluminum because of its light weight and durability. The frame is secured with four bolts that extend from the back of the front panel 111 at the corners of the window 15. The frame is sized with very close tolerances to exactly fit over the raised ridge. This makes the touch screen self-centering in the window. The frame includes a notch 32a that extends from the touch screen and connects to an interface device (not shown) that is mounted under the window 15. The touch screen may be connected to the control computer, for example, by a Microtouch controller. The Microtouch controller is preferred because it utilizes a 5-point calibration scheme for greater accuracy in aligning the X and Y axes of the screen.

The two flanged side panels 23 and 24 include at least two support pads 33 and 34. The support pads support a perimeter portion 35 on each side of the monitor 16. The support pads may optionally be vertically and/or horizontally adjusted using adjustment slots 36 to position monitors of different sizes directly behind the aperture 27 in the wall which is aligned with the window 15 in the front panel 11 of the OIT. The monitor is preferably an LCD monitor, or a flat panel monitor such as those available from Dell Computers®, in combination with the touch screen 29. The preferred embodiment may use either a 15-inch or a 17-inch flat panel monitor. However, any type of monitor may be utilized, such as a CRT monitor.

A bottom shelf 37 holds the computer 19. In the preferred embodiment, a computer with a miniature casing approximately 3 inches×10 inches×11 inches is utilized. If the computer is mounted sideways, access to the front and back of the computer is provided though openings 41 in the side panels. In an alternative embodiment, the control computer is remotely located from the OIT, and the OIT includes a wireless RF transmitter or other transmission device to carry signals from the OIT to the remotely located computer.

Optionally, the OIT may include monitor retaining brackets 38 that mount on the bolts 21 behind the flanged side panels 23 and 24. Retraining straps 39, such as nylon straps, pass through the retaining brackets 38 and pass around the back side of the monitor 16. The straps can be tightened to hold the monitor securely against the back side of the protective frame 32. The straps may be adjusted in length by any means, such as by buckles. The straps are preferably attached to the back side of the monitor by a fastener 40. An optional padding (not shown) may be mounted on the front bezel of the monitor to cushion the monitor. The padding should be as thin as possible to minimize the distance between the monitor and the touch screen 29, thereby minimizing parallax error when the monitor is viewed at an angle. By strapping the monitor tightly against the padding, the distance between the touch screen and the monitor is reduced to ¼ to ⅜ inch, thus reducing the parallax effects. This also prevents dust from getting on the monitor screen and the back of the touch screen. In addition, since the monitor and other computer components may be in a lighted room, pressing the bezel of the monitor against the padding shields the monitor screen from light that might otherwise get in around the bezel and decrease the quality of the displayed image.

Figure 3:
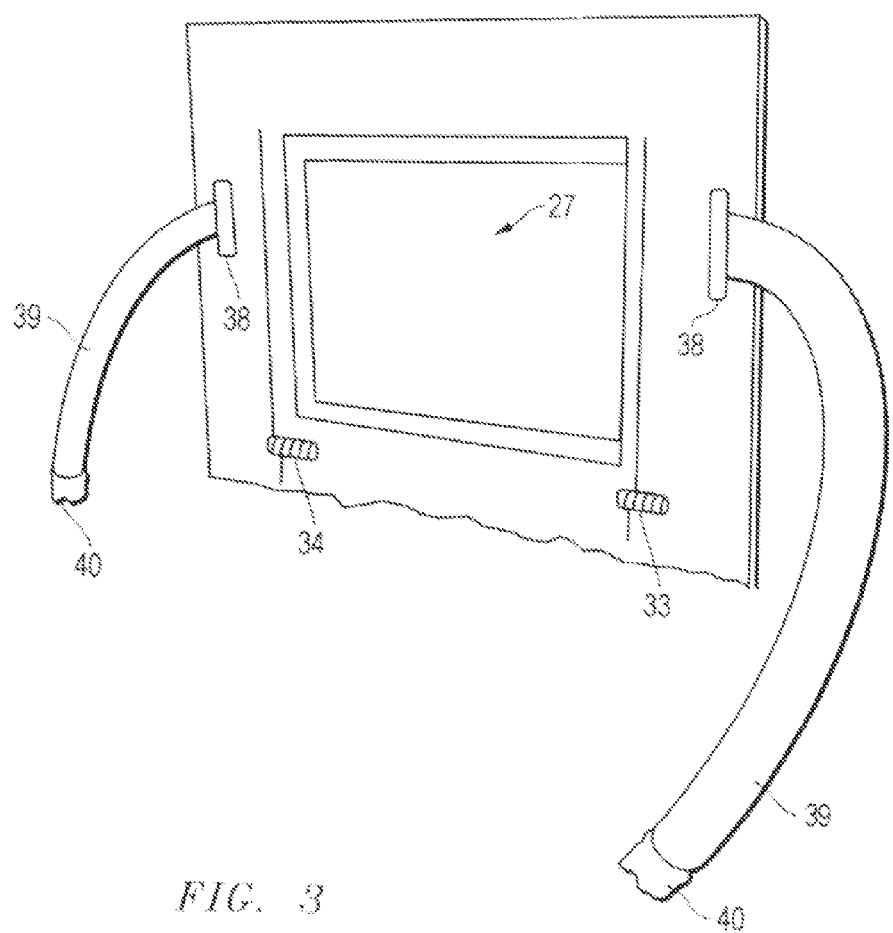
FIG. 3 is a partial rear perspective view of the support pads and with the monitor removed.

FIG. 3 is a partial rear perspective view of the support pads 33 and 34 with the monitor 16 removed. The straps are adjustable in length to accommodate a monitor of any size. The support pads 33 and 34 are positioned below and to the sides of the aperture 27. The support pads need only be of a depth necessary to support the perimeter portion 35 of the monitor. Therefore, the support pads may be of a length of approximately one to two inches in depth.

Figure 4:
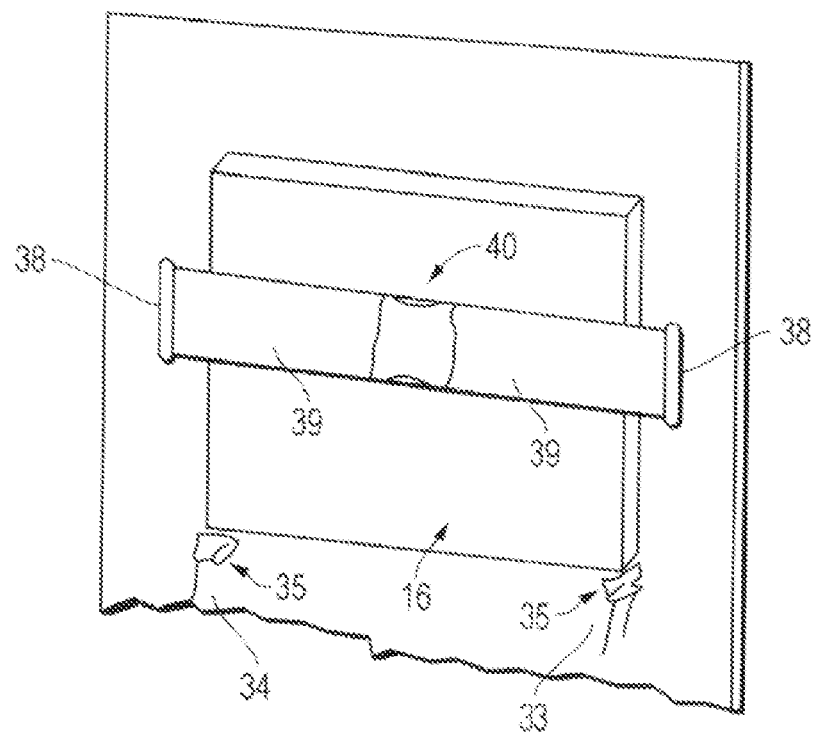
FIG. 4 is a partial rear perspective view of the monitor positioned on the support pads in the preferred embodiment of the present invention.

FIG. 4 is a partial rear perspective view of the monitor positioned on the support pads 33 and 34 in the preferred embodiment of the present invention. The monitor is supported by the support pads 33 and 34. In addition, the monitor is held in place by the retaining straps 39. The retaining straps are cinched to hold the monitor against the aperture 27. Preferably, the straps are connected at the fastener 40. However, in alternate embodiments of the present invention, the straps may be a single strap having a connection at one of the retaining brackets 38. It should be understood that the strap or straps may be affixed in any manner and adjusted in length in any manner and still perform the function of retaining the monitor against the aperture. Although retaining straps are illustrated, any mechanism which retains the monitor against the partition may be used. For example, retaining clips may be used, where the clips provide a force on a portion of the monitor, thereby retaining the monitor against the partition.

The support pads 33 ad 34 in conjunction with the retaining straps may be utilized in any system requiring the protection of a monitor from a harsh environment. Although the OIT has been discussed, the support pads and retaining straps may be used to form a retaining system in any configuration of any OIT or protective shield. Although two support pads are illustrated, one or more support pads may be utilized. If one support pad is used, the support pad is preferably positioned in a lower center position. Additionally, three or more support pads may be utilized, with the pads spaced appropriately to keep the monitor supported and aligned properly.

The retaining system provides many advantages over existing systems. The present invention enables off-the-shelf inexpensive flat panel monitors to be utilized in harsh environments, thereby dramatically decreasing the costs to the operator. In addition, since inexpensive monitors are utilized, rather than repairing expensive, specialized monitors, the monitors may be easily replaced. The monitors are removed and replaced in a simple and expeditious manner not currently possible in existing systems. Thus, when a monitor is malfunctioning or damaged, the down time of the computer system is significantly decreased. The present invention also enables the use of a wide variety of flat panel monitors to be utilized in the OIT. Thus, the OIT may employ monitors of various sizes and models.

It is thus believed that the operation and construction of the present invention will be apparent from the foregoing description. While the apparatus and system shown and described have been characterized as being preferred, it will be readily apparent that various changes and modifications could be made therein without departing from the scope of the invention as defined in the following claims.

What is claimed is:

1. An Operator Interface Terminal (OIT) for providing a man-machine interface between an operator working in a harsh environment and a control computer and monitor in a conditioned environment, said OIT comprising:

a front panel having a perimeter edge;

a partition:

means for mounting the front panel on a front side of the partition and sealing the front panel around the perimeter edge, said partition having a front side adapted for facing the harsh environment, a back side adapted for facing the controlled environment, and an aperture therein that is covered by the front panel;

at least one interface device attached to the front panel that is accessible by the operator for providing inputs to the control computer;

means for connecting the interface device to the control computer through the aperture in the partition;

a monitor;

first and second support pads affixed on the back side of said partition, said support pads supporting a bottom portion of the monitor; and means for retaining the monitor against said partition.

2. The OIT of claim 1 wherein the retaining means is a retaining strap.

3. The OIT of claim 2 wherein the retaining strap includes two strap segments affixed to said partition.

4. The OIT of claim 2 wherein the retaining strap is adjustable in length to accommodate the size of the monitor and allow the monitor to be securely held against the partition.

5. The OIT of claim 1 wherein the support pad is adjustable vertically to accommodate monitors of various sizes.

6. An Operator Interface Terminal (OIT) for providing a man-machine interface between an operator working in a harsh environment and a control computer and monitor in a conditioned environment, said OIT comprising:

a front panel having a perimeter edge;

a partition:

means for mounting the front panel on a front side of the partition and sealing the front panel around the perimeter edge, said partition having a front side adapted for facing the harsh environment, a back side adapted for facing the controlled environment, and an aperture therein that is covered by the front panel;

at least one interface device attached to the front panel that is accessible by the operator for providing inputs to the control computer;

means for connecting the interface device to the control computer through the aperture in the partition;

a monitor;

two support pads affixed on the back side of said partition, said support pads supporting a bottom portion of the monitor; and a retaining strap affixed to the back side of the partition, the retaining strap holding the monitor against the partition.

7. The OIT of claim 6 wherein the monitor is a flat panel monitor.

* * * * *